G. T. HECKMANN.
CLAMP FOR ANTISKID DEVICES.
APPLICATION FILED AUG. 4, 1916.

1,238,765.

Patented Sept. 4, 1917.

WITNESSES:
Harry A. Beimes
Else M. Siegel

INVENTOR.
George T. Heckmann
BY
ATTORNEY.

UNITED STATES PATENT OFFICE.

GEORGE T. HECKMANN, OF ST. LOUIS, MISSOURI.

CLAMP FOR ANTISKID DEVICES.

1,238,765.  Specification of Letters Patent.  Patented Sept. 4, 1917.

Application filed August 4, 1916. Serial No. 113,123.

*To all whom it may concern:*

Be it known that I, GEORGE T. HECKMANN, a citizen of the United States, residing at St. Louis, State of Missouri, have invented certain new and useful Improvements in Clamps for Antiskid Devices, of which the following is a full, clear, and exact description, reference being had to the accompanying drawings, forming a part hereof.

My invention has relation to improvements in clamps for anti-skid devices for tires; and it consists in the novel features of construction more fully set forth in the specification and pointed out in the claims.

The present invention is directed to that class of anti-skid devices which involve the use of a chain transversely encompassing the tire and felly of the wheel, the object of the invention being to provide a simple form of clamp for securing the ends of the chain, said clamp being carried by the spoke of the wheel. A further object is to provide a clamp which may be readily and quickly removed from the spoke and as quickly applied thereto when occasions arise to attach the chain to, or detach the same from, the wheel. A further object is to provide a clamp composed of two sections or jaws which when assembled are locked against displacement, the locking means at the same time serving as an anchor for one of the ends of the chain. The invention possesses advantages which will be readily apparent from a detailed description thereof in connection with the accompanying drawings, in which—

Figure 1:
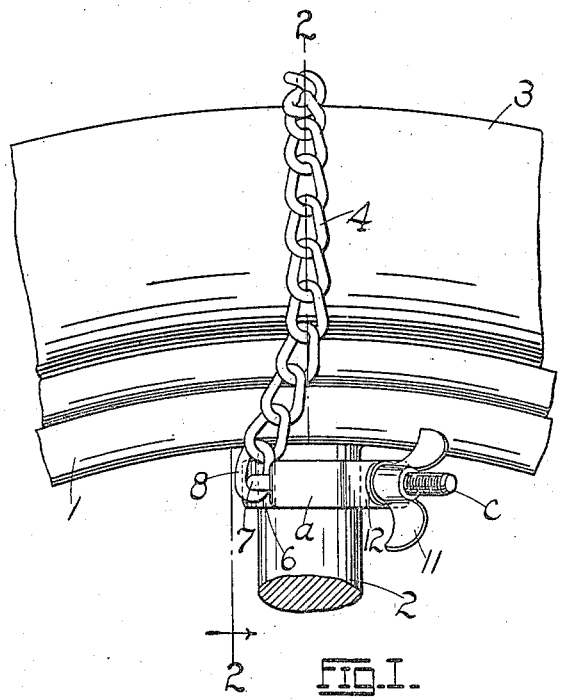
Figure 2:
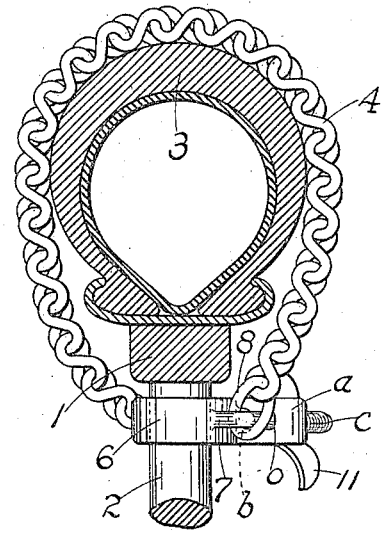
Figure 3:
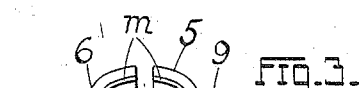
Figure 4:
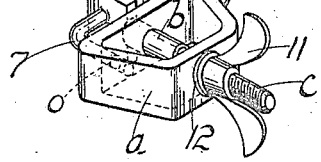

Figure 1 represents a side view of a portion of a wheel felly and tire showing my invention applied thereto; Fig. 2 is a cross-section on the zig-zag line 2—2 of Fig. 1; Fig. 3 is a perspective view of the clamp; and Fig. 4 is a plan view thereof.

Referring to the drawings, 1, represents the felly of the wheel, 2, a spoke, and 3, the tire, all as well understood in the art. The anti-skid chain is represented by 4, the same being passed transversely around the felly and tire, the ends of the chain being secured to the clamp to which the present invention is specifically directed.

In the present embodiment of my invention the clamp comprises a pair of jaws 5, 6, respectively, the same being suitably curved to jointly embrace the spoke 2 as shown. The jaw 5 forms an integral part of an enlarged hollow shank $a$ having inclined sides and parallel end walls (Fig. 4), the end walls of said shank loosely receiving the cylindrical shank $b$ of the jaw 6 and the terminal screw-threaded stem $c$ thereof. Projecting from the outer face of the jaw 6 is a bent arm or finger 7 whose free end is disposed parallel to the shank $b$ and stem $c$ of the jaw, the finger being adapted to be received in an opening $o$ formed in the adjacent wall of the shank $a$ of the jaw 5. The finger 7 may be readily retracted or disengaged from its opening $o$ by drawing the jaws apart sufficiently to effect the disengagement as shown by the dotted position of the parts in Fig. 4. The finger 7 (or its equivalent) subserves a twofold purpose. In the first place, and when the parts are assembled, it locks the jaw 6 against rotary displacement; and in the second place it permits the use of a simple, closed, anchoring ring 8 carried at the inner end of the chain 4, thus dispensing with the necessity of employing a snap-hook or equivalent form of connection as is the case where the jaw of the clamp is equipped with a closed loop or eye to which such snap-hook is fastened. The jaw 5 in the present case is provided with an eye 9 to which the ring 10 at one end of the chain 4 is permanently secured. The stem $c$ carries a wing-nut 11, a locking washer 12 being preferably interposed between it and the member $a$.

The manner of attaching the device is as follows: The jaws 5, 6, are first passed about a spoke 2, the nut 11 being unscrewed sufficiently to allow for sufficient longitudinal movement of the shank $b$ in the shank $a$ to permit withdrawal of the finger 7 out of the opening $o$ and beyond the inner terminal wall of the shank $a$ to permit the passage of the ring 8 over the finger. By now reinserting the finger into the opening $o$ and tightly screwing the nut 11, the chain is securely clamped to the wheel. To remove the chain at any time, the reverse of the operations described is necessary. The moment the finger 7 is withdrawn from its socket or opening $o$ the jaw 6 may be swung rotatively about the axis of the shank $b$ thus permitting manipulation of the parts for the quick passage of the ring 8 over the finger. The ring 8 being once passed over the finger, the latter is rotated into alinement with the hole $o$, then reinserted thereinto and the parts clamped as already described. The details here shown may obviously be departed from without in any wise affecting the nature or spirit of my invention. To insure a firm grip on the spoke the jaws 5, 6, are preferably lined with a layer of leather, rubber or equivalent material *m*.

Having described my invention what I claim is:

1. A clamp comprising a pair of separable jaws adapted to jointly embrace a suitable supporting member, one of said jaws being provided with an opening at a point beyond the opposite jaw when the jaws are assembled, a finger projecting from the opposite jaw and having a terminal bent to be received by the opening of the first jaw whereby a closed loop is formed by said finger with the first jaw, and means for holding the jaws against a separating movement when once assembled.

2. A clamp comprising a pair of separable jaws conjointly embracing a suitable supporting member, an enlarged hollow shank formed with one of the jaws, a cylindrical shank terminating in a screw-threaded stem formed with the opposite jaw and freely traversing the enlarged shank aforesaid, a finger on said opposite jaw disposed parallel to the axis of the cylindrical shank and receivable by an opening or socket formed in the adjacent wall of the enlarged shank of the first jaw for locking the opposite jaw against rotary displacement, and a securing nut on the screw-threaded stem of the cylindrical shank of the opposite jaw operating to be driven against the adjacent wall of the enlarged shank of the first jaw for clamping the jaws together.

In testimony whereof I affix my signature, in presence of two witnesses.

GEORGE T. HECKMANN.

Witnesses:
A. CRUTTENDEN,
H. R. CASSIDY.

Copies of this patent may be obtained for five cents each, by addressing the "Commissioner of Patents Washington, D. C."